United States Patent
Kitagawa

(10) Patent No.: US 9,001,382 B2
(45) Date of Patent: Apr. 7, 2015

(54) IMAGE FORMING SYSTEM AND IMAGE FORMING APPARATUS CONFIGURED FOR COST PRIORITY MODE PROCESSING

(75) Inventor: Mitsuhiko Kitagawa, Tokyo (JP)

(73) Assignee: Oki Data Corporation, Tokyo (JP)

(*) Notice: Subject to any disclaimer, the term of this patent is extended or adjusted under 35 U.S.C. 154(b) by 423 days.

(21) Appl. No.: 13/357,041

(22) Filed: Jan. 24, 2012

(65) Prior Publication Data

US 2012/0194832 A1 Aug. 2, 2012

(30) Foreign Application Priority Data

Jan. 28, 2011 (JP) .................... 2011-017246

(51) Int. Cl.
| | |
|---|---|
| H04N 1/60 | (2006.01) |
| H04N 1/00 | (2006.01) |
| H04N 1/203 | (2006.01) |
| H04N 1/23 | (2006.01) |
| H04N 1/29 | (2006.01) |
| H04N 1/333 | (2006.01) |

(52) U.S. Cl.
CPC ............ *H04N 1/60* (2013.01); *H04N 1/00204* (2013.01); *H04N 1/00278* (2013.01); *H04N 1/2032* (2013.01); *H04N 1/2338* (2013.01); *H04N 1/2369* (2013.01); *H04N 1/295* (2013.01); *H04N 1/33315* (2013.01); *H04N 1/33369* (2013.01)

(58) Field of Classification Search
None
See application file for complete search history.

(56) References Cited

U.S. PATENT DOCUMENTS

| | | | | |
|---|---|---|---|---|
| 5,589,923 | A * | 12/1996 | Lee et al. .................... | 399/78 |
| 5,681,493 | A * | 10/1997 | Yoshizuka et al. ........... | 219/494 |
| 7,565,088 | B2 * | 7/2009 | Shibasaki .................... | 399/81 |
| 8,121,496 | B2 * | 2/2012 | Matsuzaki .................... | 399/9 |
| 8,200,994 | B2 * | 6/2012 | Shibasaki .................... | 713/300 |
| 8,311,431 | B2 * | 11/2012 | Deguchi et al. ............... | 399/68 |
| 8,620,172 | B2 * | 12/2013 | Yoshizumi .................... | 399/69 |
| 2007/0154230 | A1 * | 7/2007 | Choi ........................... | 399/69 |
| 2008/0260409 | A1 * | 10/2008 | Matsumoto et al. .......... | 399/69 |
| 2011/0261382 | A1 * | 10/2011 | Koura .......................... | 358/1.13 |
| 2011/0318038 | A1 * | 12/2011 | Yoshizumi .................... | 399/69 |

FOREIGN PATENT DOCUMENTS

| | | | |
|---|---|---|---|
| JP | 2003-260857 A | | 9/2003 |
| JP | 2005-173144 A | | 6/2005 |
| JP | 2005-217878 A | | 8/2005 |
| JP | 2006301260 A | * | 11/2006 |
| JP | 2010-141670 A | | 6/2010 |
| JP | 2010141670 A | * | 6/2010 |

* cited by examiner

Primary Examiner — Dung Tran
(74) Attorney, Agent, or Firm — Kubotera & Associate LLC

(57) ABSTRACT

An image forming system includes an image forming apparatus and an upper device connected to the image forming apparatus. The image forming apparatus includes a first receiving unit for receiving a print mode including a cost priority mode; a first transmission unit for transmitting the print mode to the upper device; a second receiving unit for receiving a print instruction; a print control unit for printing the print data; a duplex print control unit for controlling a printing operation; and a fixing temperature control unit for controlling a fixing temperature. The upper device includes a first storage unit for storing a save setting; a third receiving unit for receiving image data; a second storage unit for storing the print mode; an arrangement print control unit for generating the print data; and a second transmission unit for transmitting the print instruction.

7 Claims, 7 Drawing Sheets

|  | User setting | Save setting |
|---|---|---|
| Arrangement setting | One surface | Four surfaces |
| Duplex print setting | One side print | Duplex print |
| Print density setting | No developer save | Save percentage 30% |
| Fixing temperature setting | 180°C | 170°C |

FIG. 3

|  | User setting | Save setting |
|---|---|---|
| Arrangement setting | Sixteen surfaces | Four surfaces |
| Duplex print setting | One side print | Duplex print |
| Print density setting | No developer save | Save percentage 30% |
| Fixing temperature setting | 180°C | 170°C |

FIG. 7

|  | User setting | Save setting |
|---|---|---|
| Arrangement setting | Two surfaces | Four surfaces |
| Duplex print setting | One side print | Duplex print |
| Print density setting | Save percentage 50% | Save percentage 30% |
| Fixing temperature setting | 180°C | 170°C |

FIG. 8

IMAGE FORMING SYSTEM AND IMAGE FORMING APPARATUS CONFIGURED FOR COST PRIORITY MODE PROCESSING

BACKGROUND OF THE INVENTION AND RELATED ART STATEMENT

The present invention relates to an image forming system and an image forming apparatus. More specifically, the present invention relates to an image forming system and an image forming apparatus for printing input image data using a consumable supply such as developer, a sheet, and the like.

A conventional image forming apparatus includes a plurality of sheet trays, a printing head, a developing device, a transfer device, a fixing device, and the like. When an administrator sets a power save mode, an image forming condition A of the power save mode is stored in a storage unit of the conventional image forming apparatus. When a user inputs an image forming condition B through an upper device, the upper device transmits the image forming condition B along with a flog "0" to the conventional image forming apparatus.

In the conventional image forming apparatus described above, when it is determined that the image forming condition A is different from the image forming condition B, the conventional image forming apparatus transmits a notice to the upper device, so that it is determined whether the image forming condition B can be changed to the image forming condition A. Accordingly, the user inputs an instruction to change the image forming condition B.

After the image forming condition B is changed, the upper device transmits the image forming condition B thus changed along with a flog "1" to the conventional image forming apparatus. Accordingly, the conventional image forming apparatus performs a printing operation using the image forming condition B thus changed, thereby conserving a consumable supply such as developer, a sheet, and the like. (Refer to Patent Reference)

Patent Reference: Japanese Patent Publication No. 2005-217878

In the conventional image forming apparatus disclosed in Patent Reference, in order to reduce a consumption amount of the consumable supply such as developer, a sheet, and the like, the user inputs a setting value using a printer driver with a function of the conventional image forming apparatus taken into consideration when the printing operation is performed. However, when the setting value input by the user is different from a setting value input by the administrator, it is necessary to transmit the notice to determine whether the setting can be changed one more time. Accordingly, every time when the printing operation is performed, it is necessary to input the setting value, thereby lowering operation efficiency during the printing operation. Further, when the printing operation is performed, it is necessary to supply electric power to the fixing device for fixing a developer image transferred to the sheet through heating. Accordingly, the fixing device is maintained at a temperature set for the printing operation, thereby increasing electric power consumption.

In view of the problems described above, an object of the present invention is to provide an image forming system capable of solving the problems of the conventional image forming apparatus. In the present invention, it is possible to reduce a consumption amount of a consumable supply such as developer, a sheet, and the like, as well as electric power supplied to a fixing device, thereby reducing a running cost and improving operation efficiency during a printing operation.

Further objects and advantages of the invention will be apparent from the following description of the invention.

SUMMARY OF THE INVENTION

In order to attain the objects described above, according to an aspect of the present invention, an image forming system includes an image forming apparatus and an upper device connected to the image forming apparatus.

In the aspect of the present invention, the image forming apparatus includes a first receiving unit for receiving an input of a print mode including a cost priority mode; a first transmission unit for transmitting the print mode thus received to the upper device; a second receiving unit for receiving a print instruction including a print density setting, a duplex print setting, a fixing temperature setting, and print data from the upper device; a print control unit for printing the print data thus received on a sheet according to the print density setting of the print instruction; a duplex print control unit for controlling a printing operation to be performed on a backside surface of the sheet according to the duplex print setting of the print instruction; and a fixing temperature control unit for controlling a fixing temperature according to the fixing temperature setting of the print instruction.

In the aspect of the present invention, the upper device includes a first storage unit for storing a save setting including an arrangement setting set in advance, the print density setting, the duplex print setting, and the fixing temperature setting; a third receiving unit for receiving an input of image data to be printed; a second storage unit for storing the print mode received from the image forming apparatus; an arrangement print control unit for generating the print data to be printed on one page according to the image data and the arrangement setting; and a second transmission unit for transmitting the print instruction including at least two of the print density setting, the duplex print setting, and the fixing temperature setting of the save setting stored in the first storage unit, and the print data for an arrangement printing operation generated with the arrangement print control unit according to the arrangement setting, in which a plurality of the image data is reduced and printed on the one page, when the print mode stored in the second storage unit is the cost priority mode.

According to the aspect of the present invention, when the user input the cost priority mode, it is possible to perform a printing operation while reducing a consumption amount of a consumable supply and supplied electric power, thereby reducing a running cost and improving operation efficiency during the printing operation.

BRIEF DESCRIPTION OF THE DRAWINGS

FIG. 3 is a table showing various setting values of print modes stored in an upper device of the image forming system according to the first embodiment of the present invention;

FIG. 7 is a table showing an example No. 1 of various setting values of print modes stored in the upper device of the image forming system according to the second embodiment of the present invention; and FIG. 8 is a table showing an example No. 2 of various setting values of print modes stored in the upper device of the image forming system according to the second embodiment of the present invention.

DETAILED DESCRIPTION OF PREFERRED EMBODIMENTS

Hereunder, embodiments of the present invention will be explained with reference to the accompanying drawings. It is noted that the drawings are presented for an explanation purpose only, and the present invention is not limited to the embodiments.

First Embodiment

Figure 1:
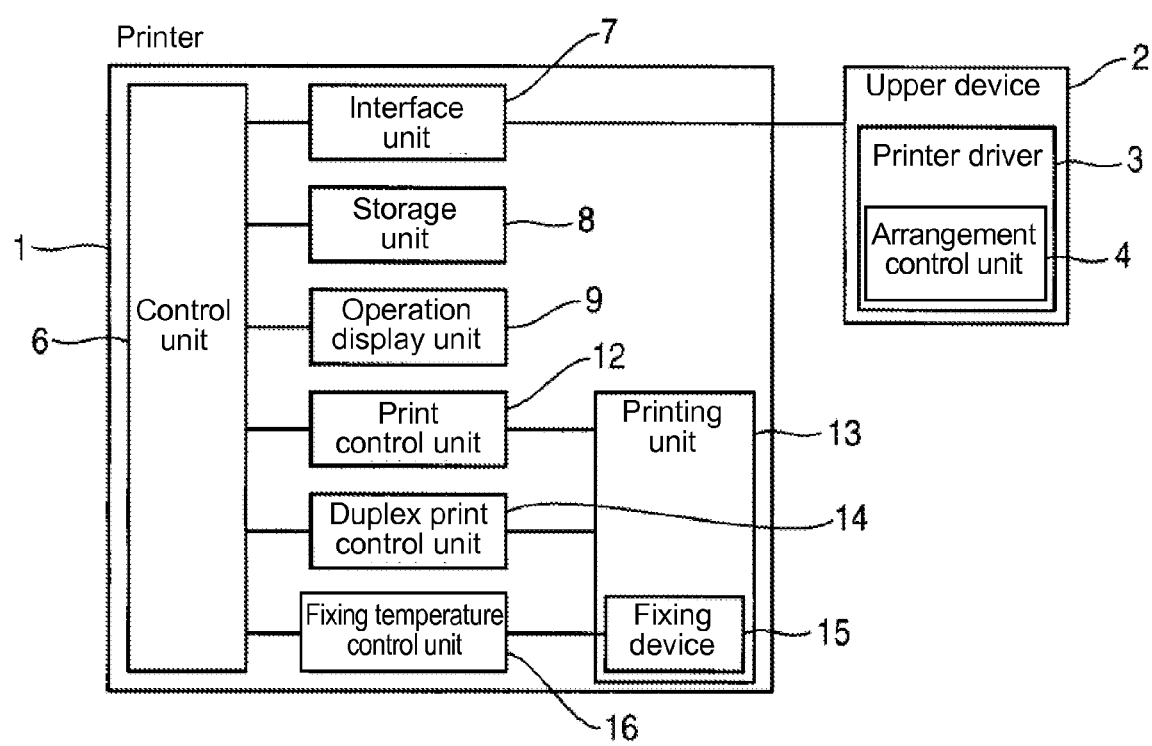
FIG. 1 is a block diagram showing a configuration of an image forming system according to a first embodiment of the present invention.

A first embodiment of the present invention will be explained. FIG. 1 is a block diagram showing a configuration of an image forming system according to a first embodiment of the present invention.

As shown in FIG. 1, the image forming system includes a printer 1 as an image forming apparatus and an upper device 2 such as a personal computer and the like. The printer 1 is connected to the upper device 2 through a network such as an LAN (Local Area Network).

In the embodiment, the upper device 2 includes an input unit for a user to input a user setting, a print instruction, and the like for a printing operation. The upper device 2 further includes a printer driver 3. When the input unit receives an input of the print instruction including image data to be printed, the printer driver 3 has a function of editing and processing the image data to convert the image data to print data compatible with the printer 1.

In the embodiment, the printer driver 3 includes an arrangement control unit 4. The arrangement control unit 4 has a function of generating the print data for an arrangement printing operation according to an arrangement setting. In the arrangement printing operation, a plurality of image data is reduced and printed on one page.

In the embodiment, the printer 1 includes a control unit 6 connected to the upper device 2 through an interface unit 7. The control unit 6 has a function of controlling each component of the printer 1 to perform a printing process and the like. The control unit 6 further has a function of transmitting and receiving data relative to the upper device 2.

In the embodiment, the printer 1 further includes a storage unit 8. The storage unit 8 includes an ROM (Read Only Memory) for storing a program to be executed with the control unit 6; an RAM (Random Access Memory) to be used as a work memory when the control unit 6 performs various processes or a buffer when the control unit 6 receives data; an EEPROM (Electrically Erasable and Programmable ROM) for storing various setting values to be stored even when power is turned off; and the like.

In the embodiment, the printer 1 further includes an operation display unit 9. As described later, the operation display unit 9 includes a display portion 10 for displaying a current status of the printer 1; a mode setting key 11 as a setting unit of a print mode for switching between a cost priority mode and a normal mode; and the like (refer to FIGS. 2(a) and 2(b)).

In the embodiment, the printer 1 further includes a print control unit 12 and a printing unit 13. The print control unit 12 has a function of controlling a density of a developer image to be formed with a developing portion (not shown) according to a setting value of a print density setting specified with the control unit 6. The print control unit 12 further has a function of controlling a voltage in each of a charging process, an exposing process, a developing process, and fixing process of the printing unit 13. The print control unit 12 further has a function of controlling a motor and the like to drive a transportation roller and the like constituting a transportation path for transporting a sheet. Accordingly, the print control unit 12 has a function of printing the print data transmitted from the control unit 6 on one side of the sheet and the like drawn from a sheet supply cassette (not shown).

In the embodiment, the printer 1 further includes a duplex print control unit 14 and a fixing device 15. The duplex print control unit 14 has a function of controlling the printing operation on the backside of the sheet together with the print control unit 12 according to a duplex print setting specified with the control unit 6. In the printing operation on the backside of the sheet, after a front side of the sheet is printed, the transportation path of the sheet discharged from the fixing device 15 is switched, so that the front side of the sheet is reversed to the backside thereof, and the sheet is transported to a developing portion of the printer 1.

In the embodiment, the printer 1 further includes a fixing temperature control unit 16. The fixing temperature control unit 16 has a function of controlling a temperature of a heating roller of the fixing device 15 according to a setting value of a fixing temperature setting specified with the control unit 6, that is, a setting temperature. Accordingly, the temperature of the heating roller is maintained at the setting temperature.

Figure 2A:
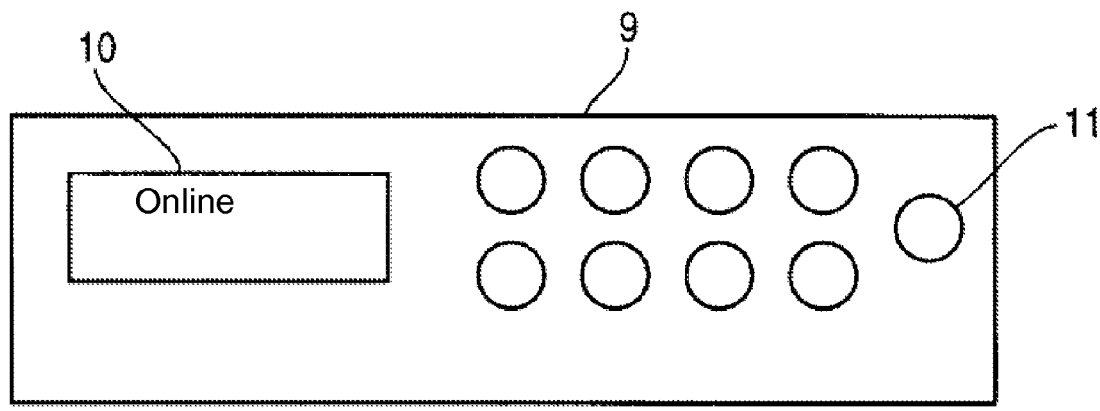
FIGS. 2(a) and 2(b) are schematic views showing an operation display unit of a printer of the image forming system according to the first embodiment of the present invention.
Figure 2B:
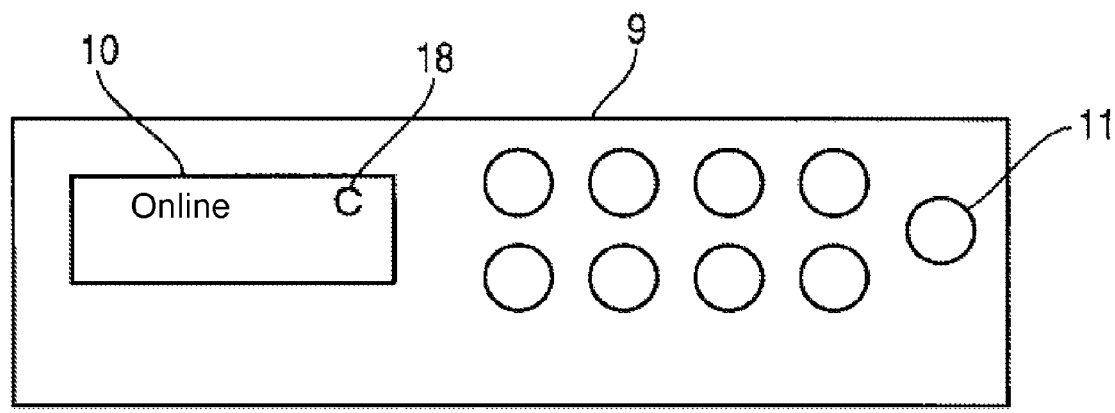

FIGS. 2(a) and 2(b) are schematic views showing the operation display unit 9 of the printer 1 of the image forming system according to the first embodiment of the present invention. As shown in FIGS. 2(a) and 2(b), the current status of the printer 1 is displayed on the display portion 10 of the operation display unit 9.

As shown in FIG. 2(a), an online status is displayed as an example, in which the printer 1 is maintained connected to the upper device 2 through the interface unit 7. When the mode setting key 11 is pushed in the online state, as shown in FIG. 2(b), a symbol "C" is displayed as a mode display 18 on a right side of the display portion 10, indicating that the print mode is the cost priority mode. When the mode setting key 11 is pushed again in the state shown in FIG. 2(b), the symbol "C" disappears from the display portion 10 as shown in FIG. 2(a). Accordingly, the mode display 18 is not displayed, indicating that the print mode is the normal mode. (In the normal mode, the printing operation is performed according to setting values set by the user.)

In other words, in the embodiment, it is configured such that every time the mode setting key 11 is pushed, the print mode is switched between the normal mode and the cost priority mode. Further, after the print mode is switched, the print mode thus switched is stored in the EEPROM of the storage unit 8, so that the print mode thus stored is maintained even after the power is turned off.

FIG. 3 is a table showing various setting values of the print modes stored in the upper device 2 of the image forming system according to the first embodiment of the present invention.

As shown in FIG. 3, a storage area of the printer driver 3 of the upper device 2 stores in advance the save setting including the arrangement setting, the print density setting, the duplex print setting, and the fixing temperature setting for performing the printing operation in the cost priority mode. It should be noted that the user is able to input various setting values in a user setting through a setting screen of the user setting when the user inputs the print instruction.

Figure 4:
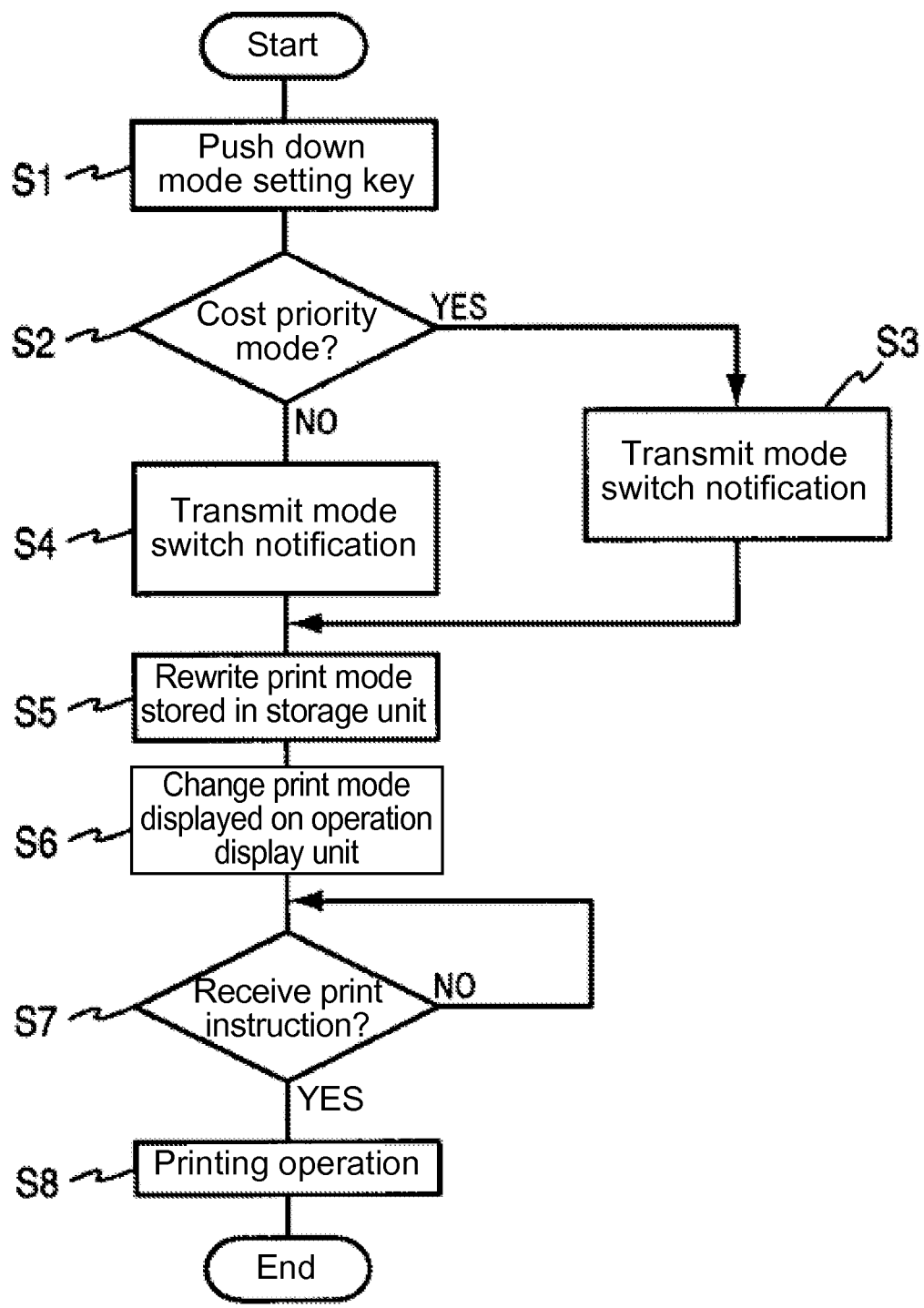
FIG. 4 is a flow chart showing an operation of a printing process of the printer of the image forming system according to the first embodiment of the present invention.

An operation of a printing process of the printer will be explained next with reference to FIG. 4. FIG. 4 is a flow chart showing the operation of the printing process of the printer of the image forming system according to the first embodiment of the present invention.

In step S1, the control unit 6 is waiting for the mode setting key 11 to be pushed down. When the user pushes down the mode setting key 11, the process proceeds to step S2. In step S2, the control unit 6 confirms that the user pushes down the mode setting key 11 through an output signal from the operation display unit 9. Further, the control unit 6 retrieves the print mode stored in the data area of the EEPROM of the storage unit 8 indicating the print mode, and determines whether the print mode is the normal mode or the cost priority mode.

When the control unit 6 determines that the print mode is the normal mode, the control unit 6 determines to switch the print mode to the cost priority mode, and the process proceeds to step S4. When the control unit 6 determines that the print mode is the cost priority mode, the control unit 6 determines to switch the print mode to the normal mode, and the process proceeds to step S3.

In step S3, after the control unit 6 determines to switch the print mode to the normal mode, the control unit 6 transmits a mode switch notification to the upper device 2 through the interface unit 7 (refer to step SA1 described later) indicating that the print mode is switched to the normal mode, and the process proceeds to step S5.

In step S4, after the control unit 6 determines to switch the print mode to the cost priority mode, the control unit 6 transmits the mode switch notification to the upper device 2 through the interface unit 7 (refer to step SA1 described later) indicating that the print mode is switched to the cost priority mode, and the process proceeds to step S5.

In step S5, when the control unit 6 receives the mode switch notification, the control unit 6 rewrites the print mode stored in the data area of the EEPROM of the storage unit 8 to the print mode thus switched. In step S6, at the same time, the control unit 6 changes the print mode displayed on the display portion 10 of the operation display unit 9 to the print mode thus switched.

As described above, when the print mode is switched to the normal mode, the mode display 18 is not displayed indicating that the print mode is the normal mode (refer to FIG. 2(a)). When the print mode is switched to the cost priority mode, the mode display 18 is displayed as the symbol "C" indicating that the print mode is the cost priority mode (refer to FIG. 2(b)).

In step S7, after the control unit 6 stores and displays the print mode thus switched, the control unit 6 waits for the print instruction to be transmitted from the upper device 2 (refer to step SA9 described later). When the control unit 6 receives the print instruction from the upper device 2, the process proceeds to step S8. When the control unit 6 does not receive the print instruction from the upper device 2, the control unit 6 continues to wait.

In step S8, when the control unit 6 receives the print instruction from the upper device 2, the control unit 6 prints the print data of the print instruction on the sheet according to the print instruction thus received. The printing operation will be explained later in more detail.

Figure 5:
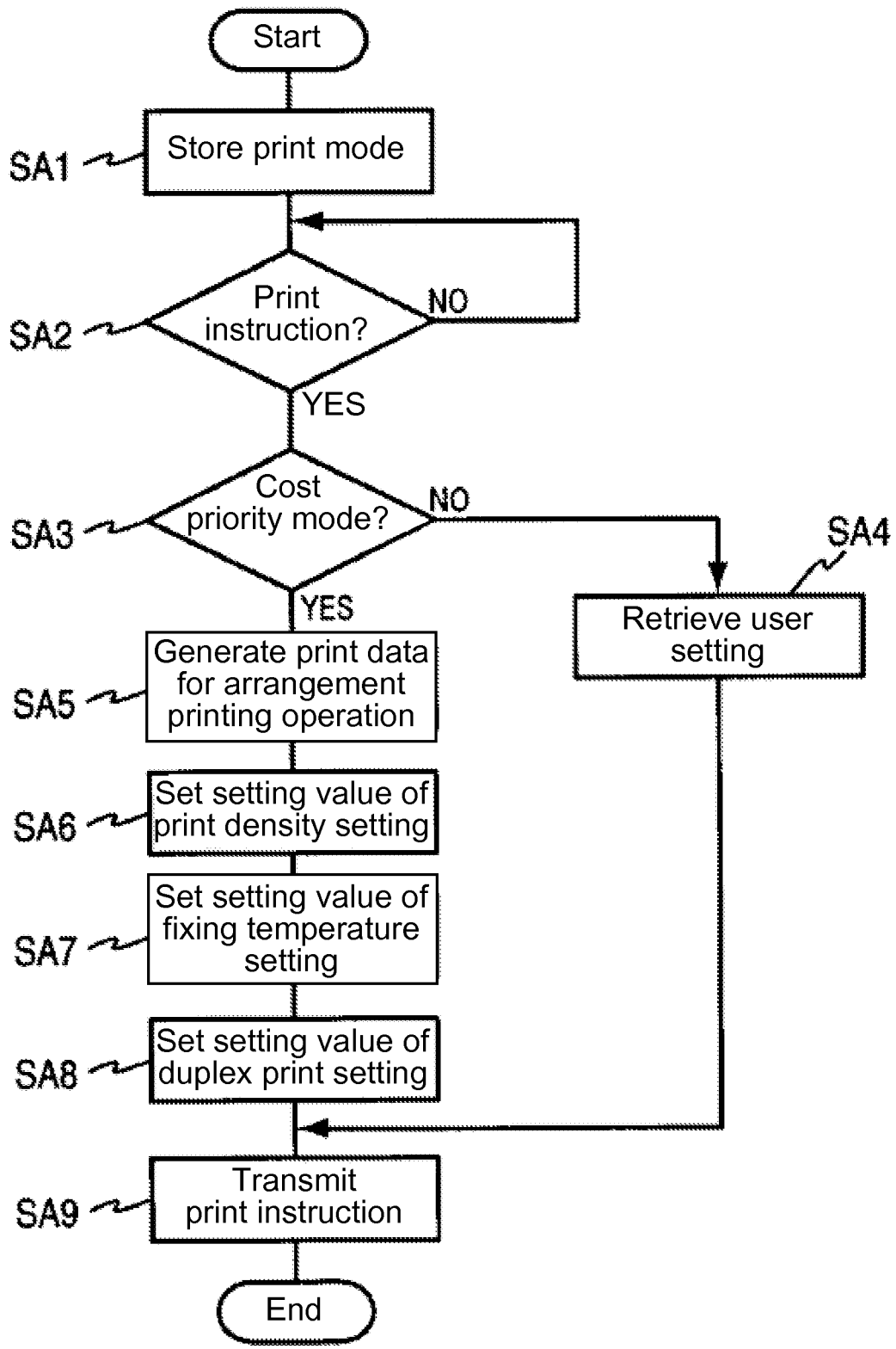
FIG. 5 is a flow chart showing an operation of a mode setting process of the upper device of the image forming system according to the first embodiment of the present invention.

An operation of a mode setting process of the upper device 2 will be explained next with reference to FIG. 5. FIG. 5 is a flow chart showing the operation of the mode setting process of the upper device 2 of the image forming system according to the first embodiment of the present invention.

In step SA1, the upper device 2 is waiting for the mode switch notification from the printer 1. When the upper device 2 receives the mode switch notification from the printer 1 (step S3 and step S4 shown in FIG. 4), the upper device 2 stores the print mode thus received in the storage area of the printer driver 3, and the process proceeds to step SA2.

In step SA2, the upper device 2 is waiting for the user to input the print instruction. When the user inputs the print instruction, the process proceeds to step SA3. When the user does not input the print instruction, the upper device 2 continues to wait.

In the embodiment, the user selects the image data to be printed from the screen of the upper device 2. Further, the user inputs the setting values of the arrangement setting, the print density setting, the duplex print setting, and the fixing temperature setting as the user setting through the setting careen of the user setting. Accordingly, the user inputs the print instruction including the user setting and the image data thus selected.

In the following description of the embodiment, it is supposed that the user does not input the setting values through the setting screen. In this case, the setting values set in the printer driver 3 in advance as the default user setting are set in the user setting of the print instruction (refer to the user setting shown in FIG. 3).

In step SA3, when the upper device 2 receives and recognizes the print instruction of the user, the upper device 2 stores the user setting of the print instruction in the storage area of the printer driver 3. Further, the upper device 2 determines the print mode stored in the storage area of the printer driver 3. When the upper device 2 determines that the print mode is the normal mode, the upper device 2 determines to perform the printing operation according to the normal mode, and the process proceeds to step SA4. When the upper device 2 determines that the print mode is the cost priority mode, the upper device 2 determines to perform the printing operation according to the cost priority mode, and the process proceeds to step SA5.

In step SA4, when the upper device 2 determines to perform the printing operation according to the normal mode, the upper device 2 retrieves the arrangement setting, the print density setting, the duplex print setting, and the fixing temperature setting of the user setting shown in FIG. 3 from the storage area of the printer driver 3. Accordingly, the upper device 2 generates the print instruction according to the setting values of the arrangement setting, the print density setting, the duplex print setting, and the fixing temperature setting.

More specifically, as shown in FIG. 3, the setting value of the arrangement setting of the user setting is "one surface". Accordingly, the upper device 2 generates the print data, in which the arrangement control unit 4 arranges each image data of the print instruction to be printed on one page. Further, the upper device 2 generates the print instruction including the print data and the setting values of the print density setting, the duplex print setting, and the fixing temperature setting. It is noted that the print density setting is "No developer save", that is a save percentage is 0%; the duplex print setting is "one side print"; and the fixing temperature setting is "180° C.". After the upper device 2 generates the print instruction, the process proceeds to step SA9.

In step SA5, when the upper device 2 determines to perform the printing operation according to the cost priority mode, the upper device 2 retrieves the arrangement setting, the print density setting, the duplex print setting, and the fixing temperature setting of the save setting shown in FIG. 3 from the storage area of the printer driver 3. Then, at first, the upper device 2 generates the print data in order to generate the print instruction.

More specifically, as shown in FIG. 3, the setting value of the arrangement setting of the save setting is "four surfaces". Accordingly, the upper device 2 generates the print data for the arrangement printing operation, in which the arrangement control unit 4 reduces each image data of the print instruction, so that the image data of four pages corresponding to the setting value of the arrangement setting is printed on one page.

In step SA6, the upper device 2 sets "save percentage 30%" as the setting value of the print density setting. In step SA7, the upper device 2 sets "170° C." as the setting value of the fixing temperature setting. In step SA8, the upper device 2 sets "duplex print" as the setting value of the duplex print setting. After the upper device 2 generates the print instruction in the cost priority mode including the setting values described above and the print data for the arrangement printing operation generated in step SA5, the process proceeds to step SA9.

In step SA9, after the upper device 2 generates the print instruction, the upper device 2 transmits the print instruction to the printer 1 (refer to step S7 shown in FIG. 4), thereby completing the mode setting process according to the print instruction.

As described above, in step S7 shown in FIG. 4, the control unit 6 of the printer 1 receives the print instruction from the upper device 2 through the interface unit 7. In step S8 shown in FIG. 4, the control unit 6 of the printer 1 prints the print data of the print instruction thus received on the sheet.

More specifically, the control unit 6 stores the print instruction thus received in a reception buffer in the RAM of the storage unit 8. Then, the control unit 6 analyzes the print instruction to deploy the print data in a print buffer in the RAM. Further, the control unit 6 transmits the setting value of the fixing temperature setting of the print instruction to the fixing temperature control unit 16. Accordingly, the fixing temperature control unit 16 controls the fixing temperature of the fixing device 15 according to the setting value thus specified.

Further, in the embodiment, the control unit 6 specifies the setting value of the print density setting of the print instruction. Then, the control unit 6 transmits the setting value of the print density setting along with the print data to the print control unit 12. Accordingly, the print control unit 12 controls a density of a developer image to be formed with the developing portion (not shown) according to the setting value of the print density setting thus specified.

Further, the print control unit 12 controls the printing unit 13 to operate at a specific timing, so that the developer image of the print data thus transmitted is transferred to the sheet. Further, the fixing device 15 fixes the developer image at the fixing temperature controlled with the fixing temperature control unit 16, so that the image is printed on the front side of the sheet.

Further, in the embodiment, the control unit 6 transmits the setting value of the duplex print setting of the print instruction to the duplex print control unit 14, so that the duplex print control unit 14 determines whether the duplex printing operation is to be performed according to the setting value thus specified.

When the setting value is the one side printing operation, after the front side of the sheet is printed, the sheet discharged from the fixing device 15 is transported and discharged outside the printer 1 through a discharge outlet thereof. When the setting value is the duplex printing operation, after the front side of the sheet is printed, the transportation path is switched, so that the sheet discharged from the fixing device 15 is reversed. The sheet thus reversed is transported to the developing portion, so that the backside surface of the sheet thus transported is printed together with the print control unit 12 at the timing. After both surfaces of the sheet are printed, the sheet is transported to the outlet of the printer 1, thereby discharging the sheet outside the printer 1.

In the embodiment, through the process described above, the control unit 6 of the printer 1 performs the printing operation of the print data with the various setting values as the print setting according to the print instruction transmitted from the upper device 2.

As described above, in the printing operation, when the printer 1 receives the print instruction generated with the upper device 2 in step SA4, as shown in FIG. 3, the print instruction includes the print data for one page including the setting values of the user setting and the image data of the print instruction generated with the arrangement control unit 4. The setting value of the print density setting is "No developer save"; the setting value of the duplex print setting is "one side print"; and the setting value of the fixing temperature setting is "180° C.". Accordingly, the one side printing operation is performed according to the print instruction, in which the front side surface of the sheet is printed for the number of the sheets corresponding to the page number of the image data selected by the user.

Further, in the printing operation, when the printer 1 receives the print instruction generated with the upper device 2 in step SA5 to step SA8, as shown in FIG. 3, the print instruction includes the print data for one page including the setting values of the save setting and the image data of the print instruction of the arrangement printing operation for four pages generated with the arrangement control unit 4. The setting value of the print density setting is "save percentage 30%"; the setting value of the duplex print setting is "duplex print"; and the setting value of the fixing temperature setting is "170° C.". Accordingly, the one side printing operation is performed according to the print instruction, in which the both side surfaces of the sheet are printed with the four surfaces for one eight of the number of the sheets corresponding to the page number of the image data selected by the user.

As described above, in the embodiment, when the user inputs the cost priority mode with the mode setting key, it is possible to perform the printing operation according to the arrangement setting, the print density setting, the duplex print setting, and the fixing temperature setting of the save setting set in advance. Accordingly, it is possible to conserve a consumption amount of the consumable supply such as developer and the sheets, and reduce electric power supplied to the fixing device 15, thereby reducing the running cost. Further, it is not necessary to set the setting values of each setting in the printing operation in order to reduce the running cost, thereby improving operation efficiency during the printing operation.

Second Embodiment

Figure 6:
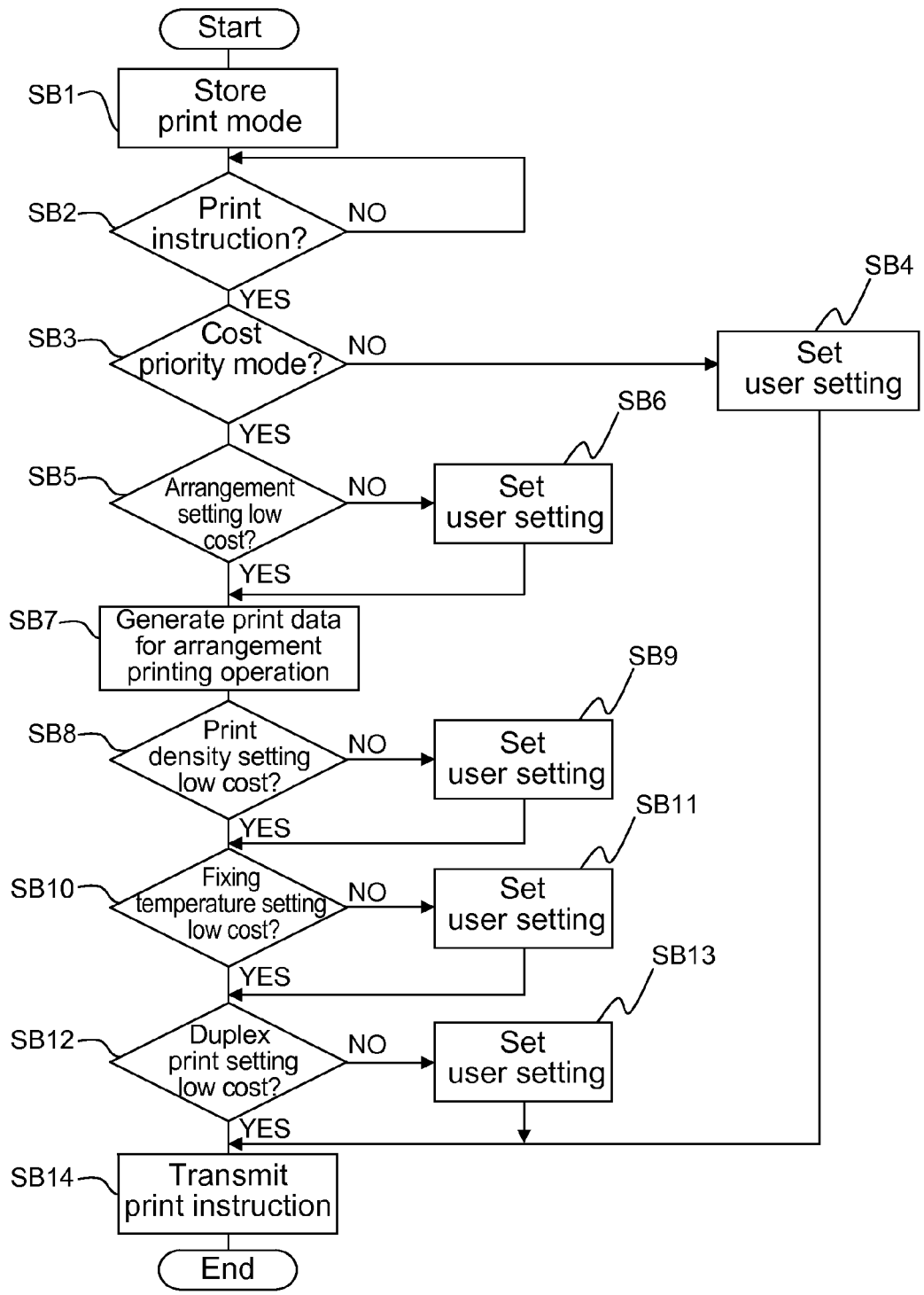
FIG. 6 is a flow chart showing an operation of a mode setting process of an upper device of an image forming system according to a second embodiment of the present invention.

A second embodiment of the present invention will be explained next with reference to FIGS. 6 to 8. Components in the second embodiment similar to those in the first embodiment are designated with the same reference numerals, and explanations thereof are omitted.

In the second embodiment, the image forming system has a configuration similar to that shown in FIG. 1 in the first embodiment. An effect of the image forming system in the second embodiment will be explained in the following description. The printing process of the printer 1 in the second embodiment is similar to that shown in FIG. 4 in the first embodiment, and an explanation thereof is omitted.

An operation of a mode setting process of the upper device 2 will be explained next with reference to FIG. 6. FIG. 6 is a flow chart showing the operation of the mode setting process of the upper device 2 of the image forming system according to the second embodiment of the present invention. It is noted that the process from step SB1 to step SB4 in the second embodiment is similar to the process from step SA1 to step SA4 in the first embodiment, and an explanation thereof is omitted.

In step SB5, after the upper device 2 determines that the printing operation is to be performed in the cost priority mode, the upper device 2 retrieves the arrangement setting, the print density setting, the duplex print setting, and the fixing temperature setting of the save setting and the user setting from the storage area of the printer driver 3. Then, the upper device 2 compares and determines which of the setting values of the arrangement setting, that is, the number of the arrangement surfaces, is the low cost.

When the upper device 2 determines that the number of the arrangement surfaces of the save setting is greater than the number of the arrangement surfaces of the user setting, that is, the number of the arrangement surfaces of the save setting is the low cost, the upper device 2 sets the setting value of the arrangement setting in the cost priority mode to the number of the arrangement surfaces of the save setting, and the process proceeds to step SB7. When the upper device 2 determines that the number of the arrangement surfaces of the user setting is greater than the number of the arrangement surfaces of the save setting, the process proceeds to step SB6.

In step SB6, after the control unit 6 determines that the number of the arrangement surfaces of the user setting is the low cost relative to the number of the arrangement surfaces of the save setting, the control unit 6 sets the setting value of the arrangement setting in the cost priority mode to the number of the arrangement surfaces of the user setting, and the process proceeds to step SB7.

FIG. 7 is a table showing an example No. 1 of the various setting values of the print modes stored in the upper device 2 of the image forming system according to the second embodiment of the present invention. In the example No. 1 shown in FIG. 7, the number of the arrangement surfaces of the save setting, "Four surfaces", is smaller than the number of the arrangement surfaces of the user setting, "Sixteen surfaces" indicated with a bold line. Accordingly, in step SB6, the number of the arrangement surfaces of the user setting is set as the setting value of the arrangement setting in the cost priority mode.

In step SB7, after the upper device 2 sets the setting value of the arrangement setting in the cost priority mode, the arrangement control unit 4 reduces the image data of the print instruction to generate the print data for the arrangement printing operation according to the setting value of the arrangement setting thus set, in which the image data of the number of the pages corresponding to the setting value of the arrangement setting is reduced to one page. Then, the process proceeds to step SB8.

In step SB8, after the upper device 2 generates the print data for the arrangement printing operation, the upper device 2 compares and determines which of the setting values of the print density setting, that is, the save percentage of developer, is the low cost. When the upper device 2 determines that the save percentage of the save setting is greater than the save percentage of the user setting, that is, the save percentage of the save setting is the low cost, the upper device 2 sets the setting value of the print density setting in the cost priority mode to the save percentage of the save setting, and the process proceeds to step SB10. When the upper device 2 determines that the save percentage of the user setting is greater than the save percentage of the save setting, the process proceeds to step SB9.

In step SB9, after the control unit 6 determines that the save percentage of developer of the user setting is the low cost relative to the save percentage of the save setting, the control unit 6 sets the setting value of the print density setting in the cost priority mode to the save percentage of the user setting, and the process proceeds to step SB10.

FIG. 8 is a table showing an example No. 2 of the various setting values of the print modes stored in the upper device 2 of the image forming system according to the second embodiment of the present invention. In the example No. 2 shown in FIG. 8, the save percentage of the save setting, "30%", is smaller than the save percentage of the user setting, "50%" indicated with a bold line. Accordingly, in step SB9, the save percentage of the user setting is set as the setting value of the print density setting in the cost priority mode.

In step SB10, after the control unit 6 sets the setting value of the print density setting in the cost priority mode, the control unit 6 compares and determines which of the setting values of the fixing temperature setting, that is, the fixing temperature, is the low cost. When the control unit 6 determines that the fixing temperature of the save setting is lower than the fixing temperature of the user setting, that is, the fixing temperature of the save setting is the low cost, the control unit 6 sets the setting value of the fixing temperature setting in the cost priority mode to the fixing temperature of the save setting, and the process proceeds to step SB12. When the control unit 6 determines that the fixing temperature of the user setting is lower than the fixing temperature of the save setting, the process proceeds to step SB11.

In step SB11, after the control unit 6 determines that the fixing temperature of the user setting is the low cost relative to the fixing temperature of the save setting, the control unit 6 sets the setting value of the print density setting in the cost priority mode to the fixing temperature of the user setting, and the process proceeds to step SB12.

In the example No. 1 shown in FIG. 7, the fixing temperature of the save setting, "170° C." indicated with a bold line, is smaller than the fixing temperature of the user setting, "180° C.". Accordingly, in step SB10, the fixing temperature of the save setting is set as the setting value of the fixing temperature setting in the cost priority mode.

In the embodiment, the fixing temperature of the save setting may be set to a lower limit of the fixing temperature. When the user sets the fixing temperature at a level lower than the lower limit, it may be possible to cause a fixing problem and the like. In this case, it may configured such that the fixing temperature of the save setting exceptionally is used as the setting value of the fixing temperature setting.

In step SB12, after the control unit 6 sets the setting value of the fixing temperature setting in the cost priority mode, the control unit 6 compares and determines which of the setting values of the duplex print setting. When the control unit 6 determines that the setting value of the save setting is the low cost relative to the setting value of the user setting, the control unit 6 sets the setting value of the duplex print setting in the cost priority mode to the setting value of the save setting, and the process proceeds to step SB14. When the control unit 6 determines that the setting value of the user setting is the low cost relative to the setting value of the save setting, the process proceeds to step SB13.

In step SB13, after the control unit 6 determines that the setting value of the user setting is the low cost relative to the setting value of the save setting, the control unit 6 sets the setting value of the duplex print setting in the cost priority mode to the setting value of the user setting, and the process proceeds to step SB14.

In the example No. 1 shown in FIG. 7, the setting value of the save setting, "Duplex print" indicated with a bold line, is the low cost relative to the setting value of the duplex print setting of the user setting, "One side print". Accordingly, in step SB12, the setting value of the save setting is set as the setting value of the duplex setting in the cost priority mode.

Through the process from step SB5 to step SB13 described above, the print instruction in the cost priority mode is generated. In step SB14, after the upper device 2 generates the print instruction, the upper device 2 transmits the print instruction to the printer 1 (refer to step S7 shown in FIG. 4), thereby completing the mode setting process according to the print instruction.

Afterward, when the control unit 6 of the printer 1 receives the print instruction from the upper device 2 through the interface unit 7 in step S7 shown in FIG. 4, the control unit 6 prints the print data of the print instruction thus received on the sheet in step S8 shown in FIG. 4. The printing operation is similar to that in step S8 in the first embodiment, and an explanation thereof is omitted. As described above, the control unit 6 of the printer 1 performs the printing process of the print data with the various setting values as the print setting according to the print instruction from the upper device 2.

More specifically, in the printing process, the upper device 2 may generate the print instruction according to the setting values of the user setting shown in FIG. 7 in step SB4. In this case, the print instruction includes the print data for one page generated with the arrangement control unit 4, in which the image data for 16 surfaces is converted to one page. Further, the print instruction includes the print density setting "No developer save"; the duplex print setting "one side print"; and the fixing temperature setting "180° C.". When the control unit 6 receives the print instruction, the control unit 6 performs the printing process according to the print instruction, in which the image data for 16 surfaces is printed on the front side of each of the sheets corresponding to one sixteenth of the number of the pages specified by the user.

Further, in the printing process, the upper device 2 may generate the print instruction in step SB5 to step SB11. In this case, the print instruction includes the print data of the arrangement printing operation for one page generated with the arrangement control unit 4, in which the image data for 16 surfaces is converted to one page. Further, according to the setting values indicated with the bold line in FIG. 7, the print instruction includes the print density setting "Save percentage 30%"; the duplex print setting "duplex print"; and the fixing temperature setting "170° C.". When the control unit 6 receives the print instruction, the control unit 6 performs the printing process according to the print instruction, in which the image data for 16 surfaces is printed on the both sides of each of the sheets corresponding to one thirty-second of the number of the pages specified by the user.

Further, in the printing process, the upper device 2 may generate the print instruction according to the setting values of the user setting shown in FIG. 8 in step SB4. In this case, the print instruction includes the print data for one page generated with the arrangement control unit 4, in which the image data for two surfaces is converted to one page. Further, the print instruction includes the print density setting "Save percentage 50%"; the duplex print setting "one side print"; and the fixing temperature setting "180° C.". When the control unit 6 receives the print instruction, the control unit 6 performs the printing process according to the print instruction, in which the image data for two surfaces is printed on the front side of each of the sheets corresponding to a half of the number of the pages specified by the user.

Further, in the printing process, the upper device 2 may generate the print instruction in step SB5 to step SB11. In this case, the print instruction includes the print data of the arrangement printing operation for one page generated with the arrangement control unit 4, in which the image data for four surfaces is converted to one page. Further, according to the setting values indicated with the bold line in FIG. 8, the print instruction includes the print density setting "Save percentage 50%"; the duplex print setting "duplex print"; and the fixing temperature setting "170° C.". When the control unit 6 receives the print instruction, the control unit 6 performs the printing process according to the print instruction, in which the image data for four surfaces is printed on the both sides of each of the sheets corresponding to one eighth of the number of the pages specified by the user.

As described above, in the second embodiment, in addition to the effect in the first embodiment, when the user inputs the cost priority mode through the mode setting key 11, the setting values of the save setting set in advance are compared with the setting values of the user setting to determine which of the setting values are the low cost. Accordingly, it is possible to perform the printing operation using the low cost setting values of the arrangement setting, the print density setting, the duplex print setting, and the fixing temperature setting. As a result, it is possible to further reduce the consumption amount of the consumable supply and electric power, thereby further reducing the running cost.

In the embodiments described above, the arrangement setting, the print density setting, the duplex print setting, and the fixing temperature setting are explained as the four setting items. Alternatively, at least two of the four setting items may be selected as the setting items of the save setting, and the remaining two (including default) may be selected as the setting items of the user setting.

In the embodiments described above, the arrangement setting is effective for reducing the number of the sheets and the consumption amount of developer, and the print density setting is effective for reducing the consumption amount of developer. Further, the duplex print setting is effective for reducing the number of the sheets, and the fixing temperature setting is effective for reducing electric power consumption. Accordingly, when at least two of the four setting items are selected as the setting items of the save setting, it is possible to reduce two of the number of the sheets, the consumption amount of developer, and electric power consumption. Further, in consideration of the running cost, the user sets one or two items, for example, the arrangement setting and the duplex print setting, in a normal setting operation. Accordingly, it is possible for the user to set without feeling any trouble.

Further, in the embodiments described above, the setting values of the save setting are set in advance. Alternatively, the setting values of the save setting may be input through the operation display unit 9 or an input unit, so that the setting values of the save setting are stored in the EEPROM or the printer driver 3.

Further, in the embodiments described above, the arrangement control unit 4 of the upper device 2 is configured to generate the print data for the arrangement printing operation.

Alternatively, the arrangement control unit 4 may be disposed in the printer 1, and the operation display unit 9 may be configured such that the user can input the setting values of the user setting. In this configuration, the setting values of the save setting are stored in the storage unit 8 of the printer 1, and the control unit 6 is configured to receive only the image data selected by the user from the upper device 2. Accordingly, it is possible to perform the mode setting process on the printer 1.

In this case, step S2 and step S3 shown in FIG. 4 are omitted, and the control unit 6 receives the image data from the upper device 2 in step S7. Then, the control unit 6 of the printer 1 performs the mode setting process shown in FIG. 5 or FIG. 6. More specifically, step SA1, step SA2, step SA9, step SB1, step SB2, and step SB12 are omitted, and the process from step SA3 to step SA8, or the process from step SB3 to step SB11 is inserted between step S7 and step S8 shown in FIG. 4. Accordingly, the printing process is performed on the sheet according to the print instruction including the print density setting, the duplex print setting, and the fixing temperature setting generated with the control unit 6, and the print data generated with the arrangement control unit 4.

The disclosure of Japanese Patent Application No. 2011-017246, filed on Jan. 28, 2011, is incorporated in the application by reference.

While the invention has been explained with reference to the specific embodiments of the invention, the explanation is illustrative and the invention is limited only by the appended claims.

What is claimed is:

1. An image forming system comprising:
an image forming apparatus; and
an upper device connected to the image forming apparatus,
wherein said image forming apparatus includes:
a first receiving unit for receiving an input of a print mode including a cost priority mode;
a first transmission unit for transmitting the print mode thus received to the upper device;
a second receiving unit for receiving a print instruction including a print density setting, a duplex print setting, a fixing temperature setting, and print data from the upper device;
a print control unit for printing the print data thus received on a sheet according to the print density setting of the print instruction;
a duplex print control unit for controlling a printing operation to be performed on a backside surface of the sheet according to the duplex print setting of the print instruction; and
a fixing temperature control unit for controlling a fixing temperature according to the fixing temperature setting of the print instruction,
said upper device includes:
a first storage unit for storing a save setting including an arrangement setting set in advance, the print density setting, the duplex print setting, and the fixing temperature setting;
a third receiving unit for receiving an input of image data to be printed;
a second storage unit for storing the print mode received from the image forming apparatus;
an arrangement print control unit for generating the print data to be printed on one page according to the image data and the arrangement setting, in which a plurality of the image data is reduced and printed on the one page; and
a second transmission unit for transmitting the print instruction including at least two of the print density setting, the duplex print setting, and the fixing temperature setting of the save setting stored in the first storage unit, and the print data for an arrangement printing operation generated with the arrangement print control unit according to the arrangement setting, when the print mode stored in the second storage unit is the cost priority mode, and
said upper device further includes a fourth receiving unit for receiving an input of a using setting from a user including the arrangement setting, the print density setting, the duplex print setting, and the fixing temperature setting; a third storage unit for storing the user setting thus received; and a setting unit for comparing setting values of the save setting and the user setting when the print mode is the cost priority mode so that a lower cost setting value is set as the setting value of the save setting or the user setting.

2. The image forming system according to claim 1, wherein said upper device further includes a fifth receiving unit for receiving an input of a setting value of the save setting from a user; and a fourth storage unit for storing the setting value of the save setting thus received.

3. An image forming apparatus, comprising:
a first storage unit for storing a save setting including an arrangement setting set in advance, a print density setting, a duplex print setting, and a fixing temperature setting;
a first receiving unit for receiving image data from an upper device;
a second receiving unit for receiving an input of a print mode including a cost priority mode;
a second storage unit for storing the print mode thus received;
an arrangement print control unit for generating print data to be printed on one page according to the image data and the arrangement setting, in which a plurality of the image data is reduced and printed on the one page; and
a print control unit for printing the print data generated with the arrangement print control unit on a sheet according to the print density setting;
a duplex print control unit for controlling a printing operation to be performed on a backside surface of the sheet according to the duplex print setting;
a fixing temperature control unit for controlling a fixing temperature according to the fixing temperature setting;
a generating unit for generating print instructions including at least two of the print density setting, the duplex print setting, and the fixing temperature setting of the save setting stored in the first storage unit, and the print data for an arrangement printing operation generated with the arrangement print control unit according to the arrangement setting when the print mode stored in the second storage unit is the cost priority mode;
a third receiving unit for receiving an input of a using setting from a user including the arrangement setting, the print density setting, the duplex print setting, and the fixing temperature setting;
a third storage unit for storing the user setting thus received; and
a setting unit for comparing setting values of the save setting and the user setting when the print mode is the cost priority mode so that a lower cost setting value is set as the setting value of the save setting or the user setting.

4. The image forming apparatus according to claim 3, further comprising a fourth receiving unit for receiving an input of a setting value of the save setting from a user; and a fourth storage unit for storing the setting value of the save setting thus received.

5. An image forming apparatus, comprising:
- a data receiving unit for receiving print data including a print setting;
- a storage unit for storing print mode information to be set to a cost priority mode or a normal mode, and a cost priority print setting to be applied to the print setting included in the print data during the cost priority mode;
- a mode setting unit for setting the print mode information to one of the cost priority mode and the normal mode; and
- a print control unit for printing the print data according to the print setting included in the print data when the print mode information stored in the storage unit is the normal mode,
- wherein said print control unit is configured to compare the print setting with the cost priority print setting when the print mode information stored in the storage unit is the cost priority mode,
- said print control unit is configured to select one of the print setting included in the print data and the cost priority print setting as a lower cost setting, and
- said print control unit is configured to print the print data according to the lower cost setting.

6. The image forming apparatus according to claim 5, wherein said print control unit is configured to compare a first setting item included in the print setting with a second setting item corresponding to the first setting item and included in the cost priority print setting,
- said print control unit is configured to select one of the first setting item and the second setting item capable of printing at a lower cost, and
- said print control unit is configured to print the print data according to the one of the first setting item and the second setting item.

7. The image forming apparatus according to claim 5, wherein each of said print setting and said cost priority print setting includes a plurality of setting items, and
- said print control unit is configured to select one of the print setting and the cost priority print setting relative to each of the setting items.

\* \* \* \* \*